United States Patent
Tajima et al.

(10) Patent No.: US 6,760,552 B1
(45) Date of Patent: Jul. 6, 2004

(54) OPTICAL RECEIVING CIRCUIT AND OPTICAL COMMUNICATION DEVICE

(75) Inventors: Akio Tajima, Tokyo (JP); Hiroaki Takahashi, Tokyo (JP); Soichiro Araki, Tokyo (JP); Naoya Henmi, Tokyo (JP); Yoshihiko Suemura, Tokyo (JP); Yoshiharu Maeno, Tokyo (JP); Seigo Takahashi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/532,420

(22) Filed: Mar. 23, 2000

(30) Foreign Application Priority Data

Mar. 29, 1999 (JP) .......................................... 11-085333

(51) Int. Cl.[7] .............................................. H04B 10/06
(52) U.S. Cl. ...................... 398/210; 398/208; 398/158
(58) Field of Search ............................... 359/189, 194, 359/195; 398/208, 209, 210, 158

(56) References Cited

U.S. PATENT DOCUMENTS

| | | | | |
|---|---|---|---|---|
| 4,590,508 A | * | 5/1986 | Hirakawa et al. | 257/379 |
| 5,066,132 A | * | 11/1991 | Nagata et al. | 356/432 |
| 5,684,783 A | * | 11/1997 | Horimai et al. | 369/124.02 |
| 5,714,895 A | * | 2/1998 | Mori et al. | 327/104 |
| 6,038,049 A | * | 3/2000 | Shimizu et al. | 398/210 |
| 6,169,619 B1 | * | 1/2001 | Ide | 398/209 |

FOREIGN PATENT DOCUMENTS

| | | |
|---|---|---|
| JP | 63-69336 | 3/1988 |
| JP | 1-137752 | 5/1989 |
| JP | 1-286655 | 11/1989 |
| JP | 4-72939 | 3/1992 |
| JP | 4-337933 | 11/1992 |
| JP | 5-160795 | 6/1993 |
| JP | 5-259752 | 10/1993 |
| JP | 7-46655 | 2/1995 |
| JP | 10-303649 | 11/1998 |

OTHER PUBLICATIONS

Japanese Office Action issued Apr. 2, 2002 (w/English translation of relevant portion).

* cited by examiner

Primary Examiner—Leslie Pascal
Assistant Examiner—Christina Y Leung
(74) Attorney, Agent, or Firm—Dickstein, Shapiro, Morin & Oshinsky, LLP.

(57) ABSTRACT

An optical receiving circuit 1 is composed of a preamplifier circuit 2, an output differential amplifier 3 and a mean value holding circuit 4. The optical receiving circuit 1 is connected to a photodetector 5 for receiving an input optical signal and outputting current. For the preamplifier circuit 2, a transimpedance type circuit may also be used. The preamplifier circuit 2 comprises a feedback resistor 21 and a resistor for detecting output voltage 22, the transimpedance gain is 55 dB Ω and 3 dB bandwidth when the photodetector 5 the capacity of which is 0.2 pF is connected to its output is 8 GHz. The output differential amplifier 3 discriminates and regenerates data by regulating reference voltage Vref between the high level and the low level of the amplitude of an input signal. The mean value holding circuit 4 includes a sample-hold circuit 41 and capacity 42 for holding the mean value of voltage output from the preamplifier circuit 2. As a CR time constant based upon the capacity 42 and the resistor for detection 22 is 1 ns., the mean value level of a received signal can be detected in approximately one byte of the data of 10 Gb/s. The sample-hold circuit 41 samples the detected mean value level according to a sampling pulse from an external device and holds it. The output of the sample-hold circuit 41 is used for the reference voltage of the differential amplifier 3.

15 Claims, 15 Drawing Sheets

Fig.5

|  | Q1 | Q2 | Q3 | S0 | S1 |  |
|---|---|---|---|---|---|---|
| CASE1 | 0 | 0 | 0 | 0 | 0 | (ARM:1) VREF10 SELECTED |
| CASE2 | 1 | 0 | 0 | 0 | 0 | (ARM:0) VREF10 SELECTED |
| CASE3 | 1 | 1 | 0 | 1 | 0 | (ARM:0) VREF11 SELECTED |
| CASE4 | 1 | 1 | 1 | 1 | 1 | (ARM:0) VREF12 SELECTED |

Fig.8

|  | D1 D2 D3 | SEL0 SEL1 | |
|---|---|---|---|
| CASE1 | 0  0  0 | 0   0 | (ARM:1) VREF10 SELECTED |
| CASE2 | 1  0  0 | 0   0 | (ARM:0) VREF10 SELECTED |
| CASE3 | 1  1  0 | 1   0 | (ARM:0) VREF11 SELECTED |
| CASE4 | 1  1  1 | 1   1 | (ARM:0) VREF12 SELECTED |

Fig.11

|        | V0 | V1 | V2 | V3 | SEL0 | SEL1 |                      |
|--------|----|----|----|----|------|------|----------------------|
| CASE1  | 0  | 0  | 0  | 0  | 0    | 1    | (ARM:1) Q0 SELECTED  |
| CASE2  | 1  | 0  | 0  | 0  | 0    | 1    | (ARM:0) Q0 SELECTED  |
| CASE3  | 1  | 1  | 0  | 0  | 1    | 0    | (ARM:0) Q1 SELECTED  |
| CASE4  | 1  | 1  | 1  | 0  | 1    | 1    | (ARM:0) Q2 SELECTED  |
| CASE5  | 1  | 1  | 1  | 1  | 1    | 1    | (ARM:1) Q2 SELECTED  |

Fig.14

|  | V0 V1 V2 V3 | SEL0 SEL1 |  |
|---|---|---|---|
| CASE1 | 0 0 0 0 | 0 0 | (ARM:1) Q0 SELECTED |
| CASE2 | 1 0 0 0 | 0 0 | (ARM:0) Q0 SELECTED |
| CASE3 | 1 1 0 0 | 1 0 | (ARM:0) Q1 SELECTED |
| CASE4 | 1 1 1 0 | 1 1 | (ARM:0) Q2 SELECTED |
| CASE5 | 1 1 1 1 | 0 1 | (ARM:0) Q2 SELECTED |

US 6,760,552 B1

OPTICAL RECEIVING CIRCUIT AND OPTICAL COMMUNICATION DEVICE

BACKGROUND OF THE INVENTION

1. Field of the Invention

The present invention relates to an optical receiving circuit and an optical communication device respectively applied to an optical network using an optical switch, particularly relates to an optical receiving circuit and an optical communication device that can follow the variation of a level of an input optical signal at high speed.

2. Description of the Related Art

In an optical network using an optical space switch, large throughput of approximately a few Gb/s. to 10 Gb/s. per port is acquired by utilizing large capacity of optical signals. Therefore, a small-sized small-latency network with large capacity can be realized, compared with a case using an electrical switch.

In case the scale of such an optical network is enlarged, the dispersion of output power of an optical transmitter of each input port, the dispersion of the loss of an optical connector every path, the dispersion of the loss of a switching element and the dispersion of the loss of an optical fiber cable pile and the dispersion every path of signal light power input to an optical receiver connected to an output port increases. Therefore, as an optical receiver in an output port may receive signals greatly different in a level when a path is switched by an optical space switch, the optical receiver is required to receive according to difference in a level. It is desired that time for following difference in a level among received signals is approximately a few bits in order to reduce guard time in switching possibly and enhance the efficiency of transmission, however, a high speed optical receiver which has the throughput of a few Gb/s or more and to which a few time slots are allocated to meet difference in a level is not examined so much.

A conventional type optical network such as disclosed in Japanese Patent laid-open publication No. Hei 4-72939, "Packet switching system using photonic switch" uses an AC coupled optical receiver. The AC coupled optical receiver has advantages that a dynamic range is large and the duty ratio variation is small and can follow a gentle level variation of approximately 1000 time slots or more. The optical receiver uses an automatically gain controlled (AGC) circuit amplifier to receive signals different in a level. The time constant of automatic gain control (AGC) is set to approximately $1\times10^3$ to $1\times10^5$ times of one time slot so that a dc level is unchanged even for long continuation of same bits.

However, in the conventional type AC coupled optical receiver, AC coupling and an AGC time constant are approximately $1\times10^3$ to $1\times10^5$ times of one time slot. Therefore, when two optical signals having difference in a level are switched by an optical switch, it takes time equal to approximately $1\times10^3$ to $1\times10^5$ times of one time slot until the optical receiver can follow the level of an optical signal switched by the optical switch. That is, as it takes 1000 bits or more, it is difficult to follow large difference in a level between optical signals in a few time slots and receive a new optical signal. In the above patent application, the variation of a level in switching is followed by equalizing switching time with an AGC time constant, however, as it takes time equivalent to 1000 bits or more, an efficient small-latency network with large capacity cannot be realized. On the contrary, when AC coupling and an AGC time constant are approximately ten times of one time slot, there is a problem that allowable transmission codes is limited under the variation of a level in switching followed in time equivalent to approximately 10 bits.

In the meantime, a DC coupled receiver that can receive even when the high speed variation of a level occurs in one time slot has two types, that is, a discrimination level fixed type and an instantaneous response automatic discrimination level control type. As for the discrimination level fixed type DC coupled optical receiver, although the configuration and design of circuits are simple, there is a problem that a dynamic range is small and duty ratio greatly varies depending upon the level of a received signal and the optical receiver is not suitable for practical use. The instantaneous response automatic discrimination level control type DC coupled optical receiver controls every time slot so that the discrimination level of a received signal is a suitable value and has excellent characteristics that the variation of duty ratio is small and that a dynamic range is large. However, it is very difficult to manufacture the device that is operated in a wide band of a few GB/s. or more because of a limit in the operating speed of the following device. Therefore, there is a problem that it is difficult to realize a DC coupled optical receiver operated at the frequency of a few Gb/s or more and suitable for practical use. In case an optical data link cannot transmit and receive data correctly when an optical network is actually configured using the optical data link and an optical switch, the network cannot be realized. In case an optical receiver based upon prior art is used, it is difficult to realize a large-scale small-sized small-latency optical network with large capacity.

SUMMARY OF THE INVENTION

The object of the invention is to provide an optical receiving circuit and an optical communication device respectively indispensable to realize a large-scale small-sized small-latency optical network with large capacity, operated at the high speed of a few Gb/s or more and which can follow the variation of the level of an input signal in a few time slots.

An optical receiving circuit according to the present invention is provided with a preamplifier circuit which is connected to a photodetector for receiving an optical signal and to which photo current from the photodetector is input, an output differential amplifier to which the output of the preamplifier circuit is input and a reference voltage generating circuit to which reference voltage generated based upon a mean value per time of voltage output from the preamplifier circuit is input to be referred by the output differential amplifier.

An optical receiving circuit according to another aspect of the present invention is provided with a preamplifier circuit which is connected to a photodetector for receiving an optical signal and to which photo current from the photodetector is input, plural differential amplifiers to which a signal output from the preamplifier circuit is input and which have threshold voltage respectively different, an output voltage holding circuit for holding voltage respectively output from the plural differential amplifiers, a determination circuit for determining the mean value of the output of the preamplifier circuit according to threshold voltage based upon the output of the output voltage holding circuit and outputting a selection signal and a selecting circuit for selecting one signal out of the output of the plural differential amplifiers based upon the selection signal.

An optical communication device according to the present invention is provided with an optical transmitting circuit for outputting an optical signal modulated based upon transmit data, an optical fiber transmission line for transmitting the optical signal and an optical receiving circuit according to a seventh aspect for receiving the optical signal output via the optical fiber transmission line.

BRIEF DESCRIPTION OF THE DRAWINGS

The above and other objects, features and advantages of the present invention will become more apparent from the following detailed description when taken in conjunction with the accompanying drawings wherein:

FIG. 5 shows the operation of a Vref selecting circuit;

FIG. 8 shows the operation of a determination circuit;

FIG. 11 shows the operation of the determination circuit;

FIG. 14 shows the operation of the determination circuit; and

DETAILED DESCRIPTION OF THE PREFERRED EMBODIMENTS

Figure 1:
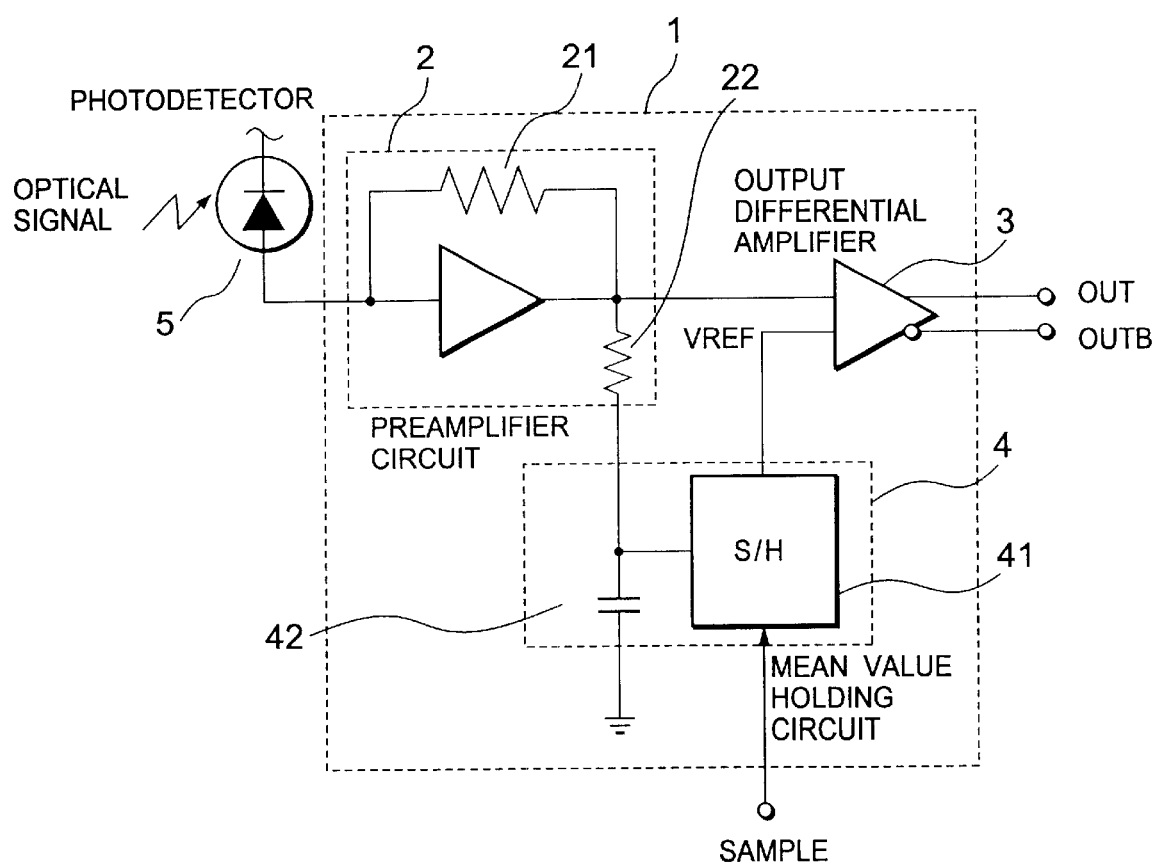
FIG. 1 is a block diagram showing an optical receiving circuit according to a first embodiment of the present invention.

Next, referring to the drawings, embodiments of the invention will be described.

First Embodiment

Figure 2:
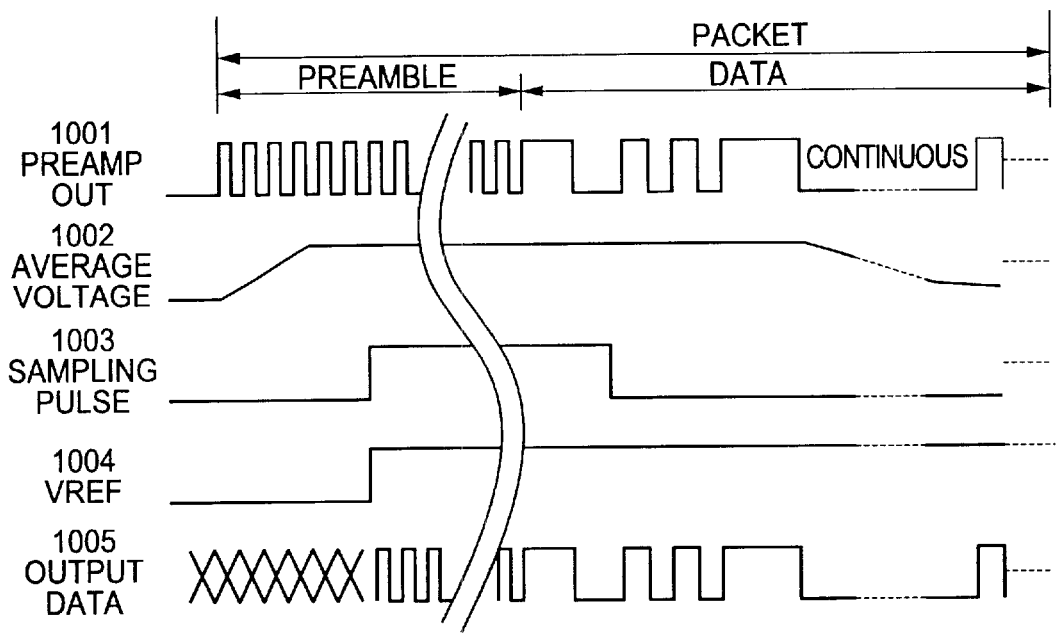
FIG. 2 is a timing chart for explaining the operation of the optical receiving circuit according to the first embodiment.

Referring to FIGS. 1 and 2, a first embodiment of the present invention will be described below. FIG. 1 is a block diagram showing an optical receiving circuit equivalent to the first embodiment. As shown in FIG. 1, the optical receiving circuit 1 comprises a preamplifier circuit 2, an output differential amplifier 3 and a mean value holding circuit 4. The optical receiving circuit 1 is produced in a GaAs·EMES-FET process having a gate 0.15 μm long and is connected to a photodetector 5 for receiving an input optical signal and outputting current.

For the preamplifier circuit 2, a transimpedance type circuit is used. The preamplifier circuit 2 comprises a feedback resistor 21 and a resistor for detecting output voltage 22, with its transimpedance gain of 55 dBΩ and 3 dB bandwidth of 8 GHz when the photodetector 5 the capacity of which is 0.2 pF is connected to its input.

The output differential amplifier 3 discriminates and regenerates data by regulating reference voltage Vref between a high level and a low level of the amplitude of an input signal.

The mean value holding circuit 4 includes a sample-hold circuit 41 and capacity 42 for holding the mean value of voltage output from the preamplifier circuit 2. As a CR time constant based upon the capacity 42 and the resistor for detection 22 is 1 ns, the level of the mean value of a received signal can be detected in approximately one byte of the data of 10 Gb/s. The detected level of the mean value is input to the sample-hold circuit 41, is sampled according to a sampling pulse from an external device and is held. Data can be precisely discriminated and regenerated by using the output of the sample-hold circuit 41 for reference voltage for the differential amplifier 3.

Next, the operation of the first embodiment will be described using a timing chart shown in FIG. 2. A received optical signal is a 64 to 859-byte packeted signal and a data transmission rate is 10 Gb/s. The leading 6 bytes of a packet are a preamble for determining the level of a signal and for pull-in, '1010-' is repeated, 2 bytes are a header for synchronizing with a frame and 4 bytes are a signal for controlling others. In FIG. 2, a case that one packet of an optical signal is received is shown and the latter half 2 bytes of the 6-byte preamble and the following data are also shown. As the photodetector 5 outputs photo current proportional to an input optical signal, photo current input to the preamplifier circuit 2 is converted to current/voltage and is output in the form of a waveform 1001. The average voltage of the waveform 1001 varies in the time constant of approximately one byte as a waveform 1002. In case a bit '0' continues by 10 bits or more in an input signal, the value is approximately 0 V. As the mean value of the output of the preamplifier circuit 2 is detected from the capacity 42 in one byte in the preamble as shown in the waveforms 1001 and 1002 when a packet is input, a sampling pulse is input to the sample-hold circuit 41 from an external device among second to fifth bytes of the preamble as shown in a waveform 1003, the mean value of the detected data is sampled and held, and the level of the packet is held while the packet is received. Even when a bit '0' continues by 10 bits or more in an input signal and mean value voltage varies, the held value is unchanged as shown in a waveform 1004. Therefore, while a packet is received, input data can be discriminated under the always same reference voltage Vref. As a level is detected in a preamble, is sampled and held and data is discriminated using the value as reference voltage Vref even when levels every packet are different, data can be correctly received.

Second Embodiment

Figure 3:
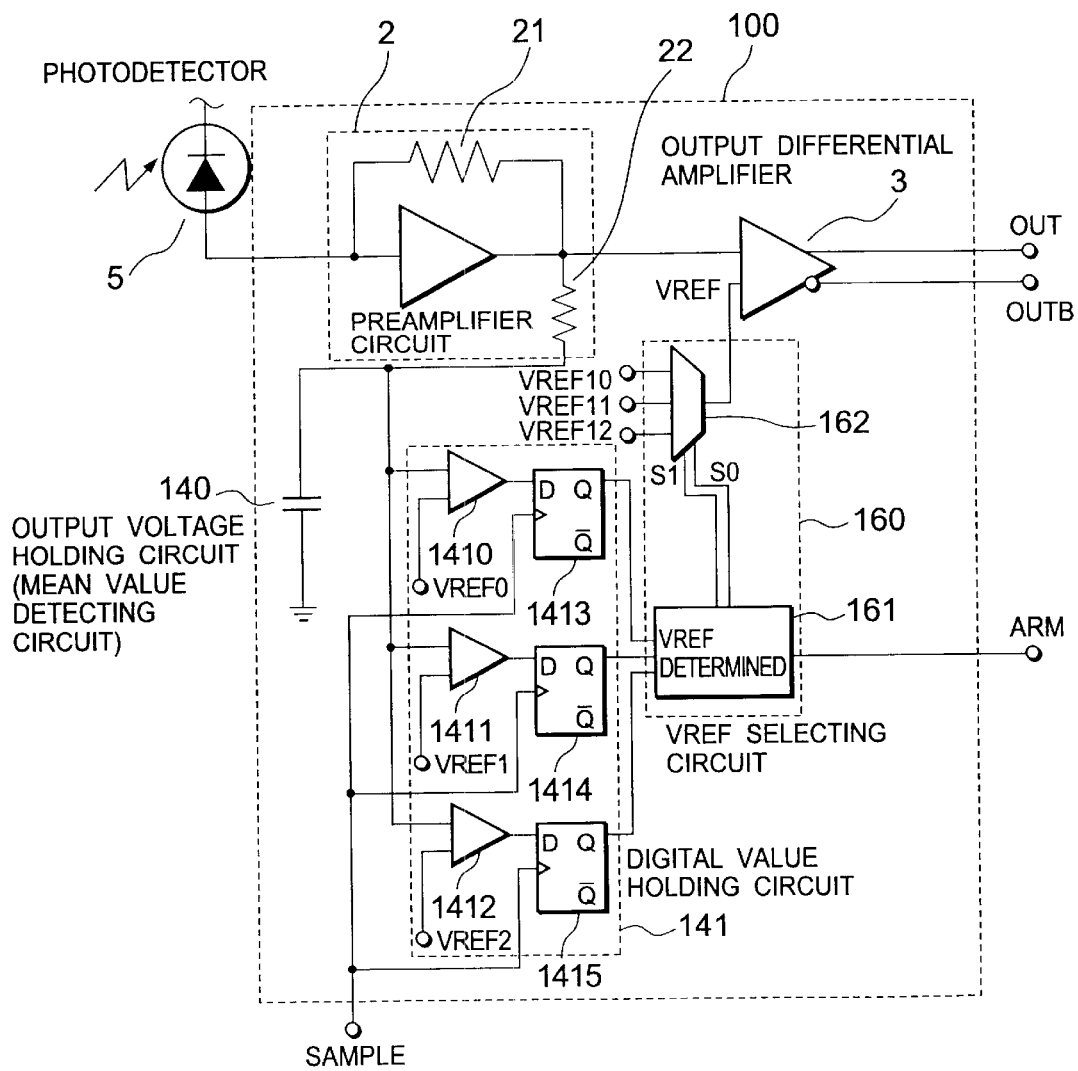
FIG. 3 is a block diagram showing an optical receiving circuit according to a second embodiment of the invention.
Figure 4:
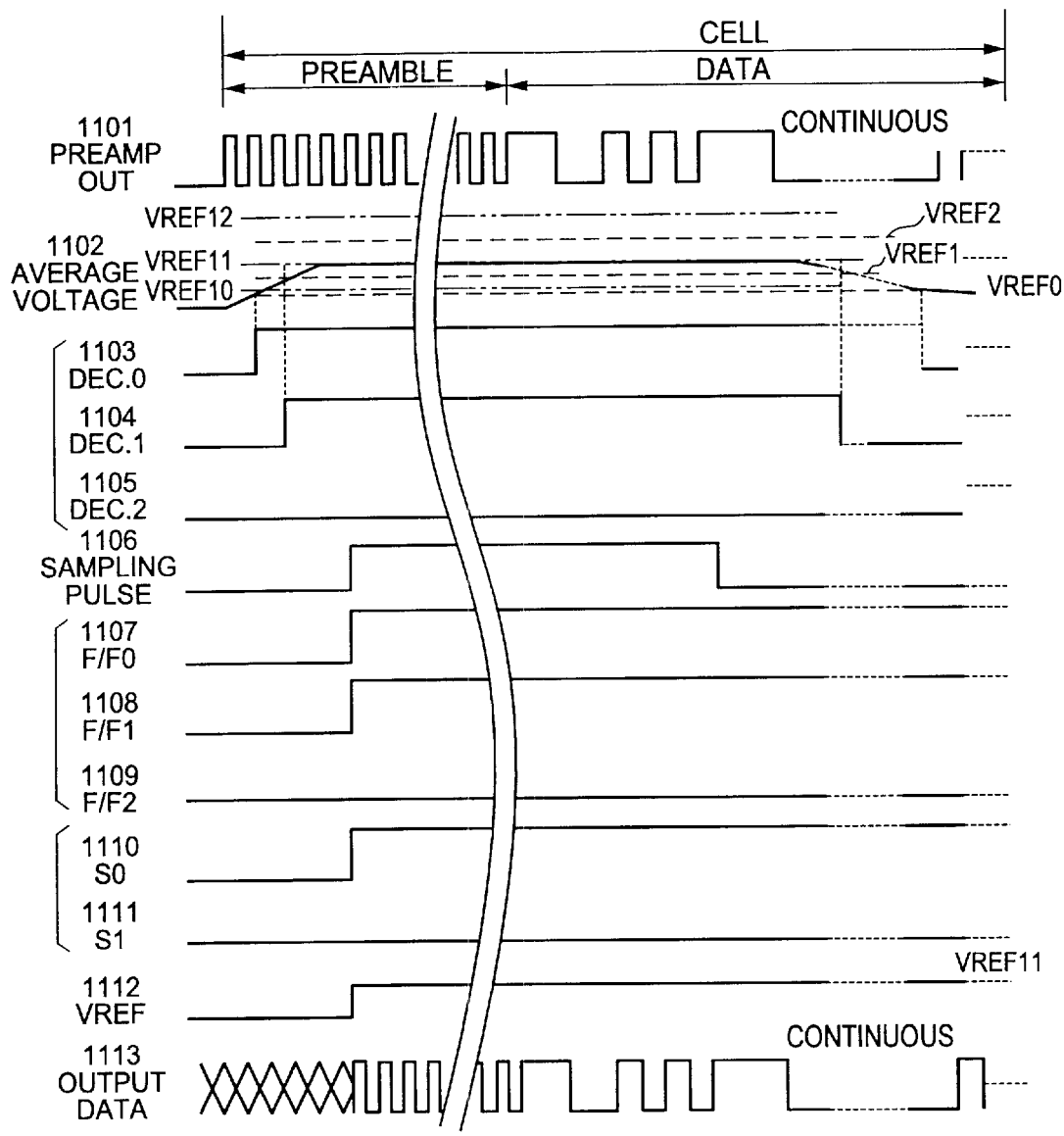
FIG. 4 is a timing chart for explaining the operation of the optical receiving circuit according to the second embodiment.

Next, referring to FIGS. 3 and 4, a second embodiment of the present invention will be described. FIG. 3 is a block diagram showing an optical receiving circuit according to the second embodiment and the same reference numerals is allocated to a part equal to that in the first embodiment. An optical receiving circuit 100 is produced in a GaAs·EMES-FET process having a gate 0.15 μm long and is connected to a photodetector 5. The optical receiving circuit 100 comprises a preamplifier circuit 2, an output differential amplifier 3, an output voltage holding circuit 140, a digital value holding circuit 141 and a Vref selecting circuit 160.

The preamplifier circuit 2 is similar to that in the first embodiment. The output voltage holding circuit 140 is a mean value detecting circuit for detecting the mean value of the output of the preamplifier circuit 2. The output voltage holding circuit 140 has a capacity and its time constant is set to 1 ns. Therefore, the mean value level of a received signal can be detected in approximately one byte of the data of 10 Gb/s. The digital value holding circuit 141 comprises three flip-flops 1413, 1414 and 1415 different in threshold voltage to simplify the description, converts voltage output from the output voltage holding circuit 140 to a digital value and holds the value according to a sampling pulse from an external device. In this embodiment, differential amplifiers 1410, 1411 and 1412 different in a threshold are connected to each data input terminal of the three flip-flops 1413, 1414 and 1415 different in threshold voltage so that each flip-flop is operated by different thresholds. Each threshold of each differential amplifier 1410, 1411 and 1412 is Vref0, Vref1 and Vref2, Vref0 is 10 mV, Vref1 is 40 mV and Vref2 is 100 mV.

The Vref selecting circuit 160 is a circuit for selecting voltage as the reference voltage Vref of the differential amplifier 3 out of plural threshold voltage Vref10, Vref11 and Vref12 based upon the output value of the digital value holding circuit 141 and is composed of a Vref determining circuit 161 for determining Vref based upon the output value of the digital value holding circuit 141 and a selector 162. FIG. 5 shows relationship among input/output signals to/from the Vref selecting circuit 160.

The three values of plural threshold voltage Vref10, Vref11 and Vref12 input to the selector 162 so that they are selected as reference voltage Vref are respectively 20 mV, 60 mV and 140 mV.

Next, the operation of the circuits in the second embodiment will be described using a timing chart shown in FIG. 4. In this embodiment, a received optical signal is a packet (cell) signal composed of 64 bytes and the data transmission rate is set to 10 Gb/s. The leading 6 bytes of the cell are a preamble for determining the level of a signal and for pull-in, are '1010-', 2 bytes of them are a header for synchronizing with a frame, 4 bytes of them are a signal for controlling others and a case that one cell is received is shown. As the photodetector 5 outputs photo current proportional to an input optical signal, photo current input to the preamplifier circuit 2 is converted from current signal to a voltage signal and a waveform 1101 is output. Similar to the first embodiment, the average voltage of the waveform 1101 varies in the time constant of approximately one byte as shown in a waveform 1102 and when a packet is input, the mean value of the output of the preamplifier circuit 2 is detected in one byte in the preamble as shown in the waveform 1102. Afterward, while the preamble is received, the mean value becomes a fixed value. In this example, as the mean value is larger than Vref1 and is smaller than Vref2, the output of the differential amplifiers 1410, 1411 and 1412 different in a threshold at this time is respectively "1", "1" and "0" as shown in waveforms 1103 to 1105. As shown in a waveform 1106, when a sampling pulse is input to each flip-flop 1413, 1414 and 1415 from an external device among the second to the fifth bytes of the preamble and the output of the differential amplifiers different in a threshold is respectively fetched and held, a digital value acquired by converting the level of the cell can be held while the cell is received. In this example, the output of waveforms 1107 to 1109 is respectively "1", "1" and "0". When reference voltage is selected out of Vref10, Vref11 and Vref12 based upon these values, Vref11 is selected as the reference voltage Vref of the differential amplifier 3. Even when a bit "0" continues by 10 bits or more in an input signal and mean value voltage varies, the selected reference voltage Vref is unchanged as shown in a waveform 1111. Therefore, while the cell is received, input data can be discriminated under always the same reference voltage Vref. As a level is detected in the preamble, suitable reference voltage out of plural voltage is selected and used and data are discriminated even when levels every cell are different, data can be correctly received.

In the second embodiment, the output voltage holding circuit 140 for holding the output of the preamplifier circuit 2 is composed using a mean value holding circuit. However, in place of the mean value holding circuit, a peak detecting circuit for detecting the peak value of output may be also used. A peak value detected by the peak value detecting circuit is input to the digital value holding circuit 141 and reference voltage may be also selected in the Vref selecting circuit 160 based upon each output of the flip-flops 1413 to 1415 different in a threshold. In this modified example, reference voltage can be also stabilized as in the second embodiment.

Third Embodiment

Figure 6:
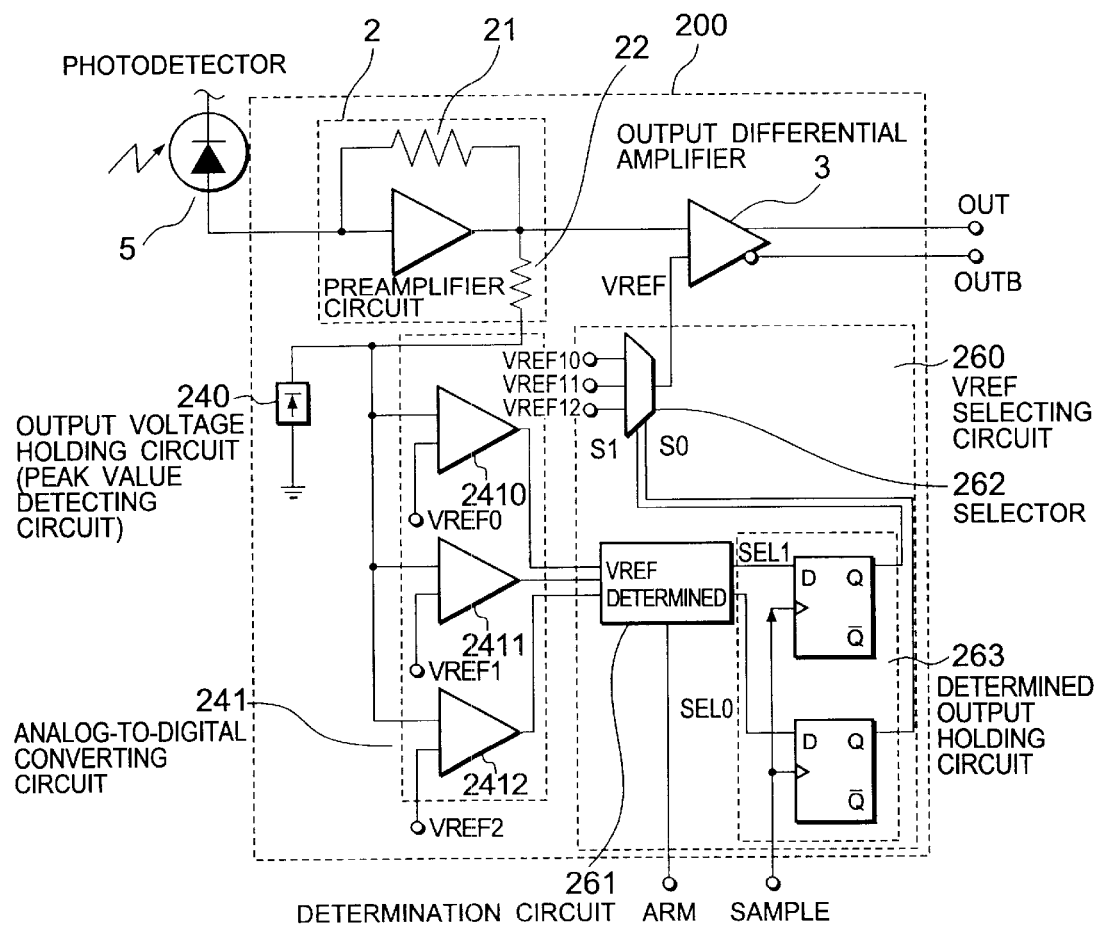
FIG. 6 is a block diagram showing an optical receiving circuit according to a third embodiment of the present invention.
Figure 7:
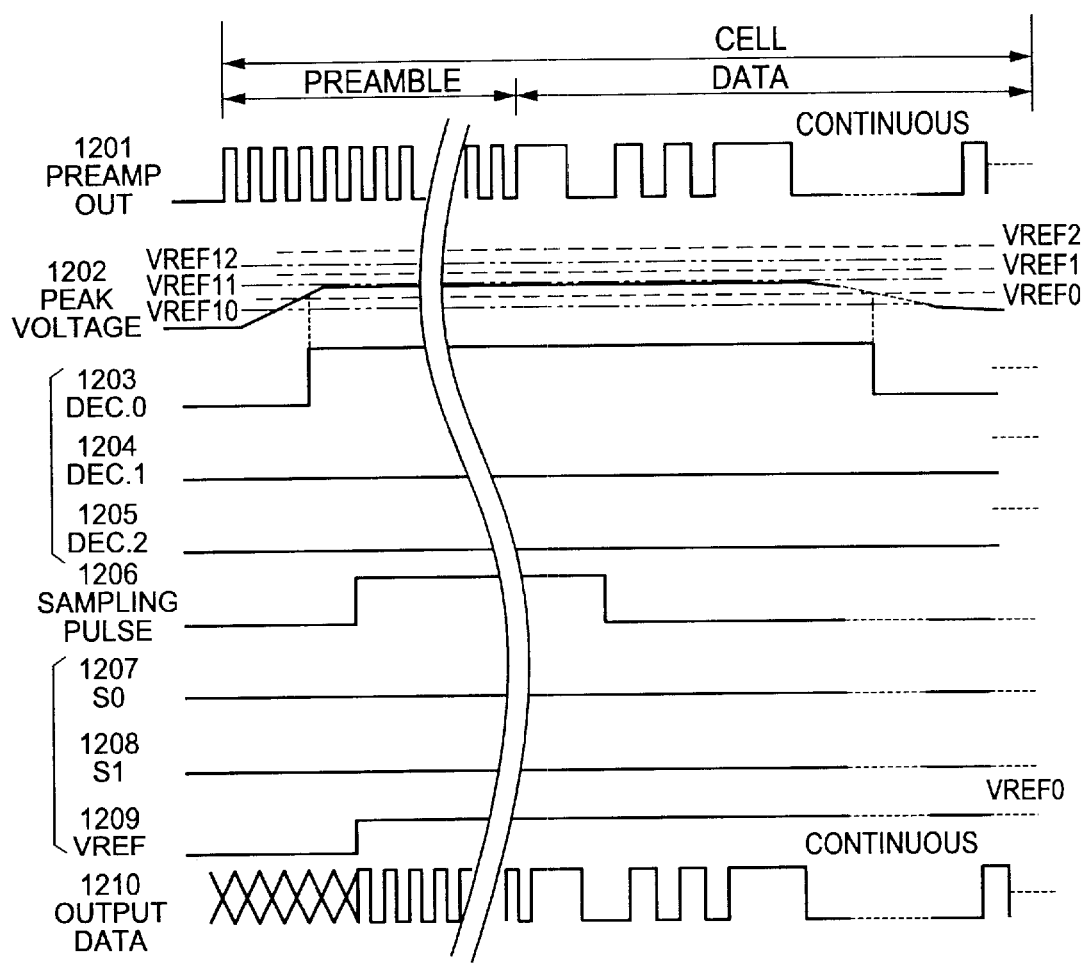
FIG. 7 is a timing chart for explaining the operation of the optical receiving circuit according to the third embodiment.

Next, referring to FIGS. 6 and 7, a third embodiment of the present invention will be described. FIG. 6 is a block diagram showing the third embodiment and the same reference number is allocated to a part equal to that in the embodiments described above. An optical receiving circuit 200 connected to a photodetector 5 is produced in a GaAs·EMES-FET process having a gate 0.15 μm long. The optical receiving circuit 200 comprises a preamplifier circuit 2, a differential amplifier 3, an output voltage holding circuit 240, an analog-to-digital converting circuit 241 and a Vref selecting circuit 260. The preamplifier circuit 2 is similar to that in the first embodiment. The output voltage holding circuit 240 is composed as a peak detecting circuit for holding the peak value of the output of the preamplifier circuit 2 and its time constant is set to 1 ns. Therefore, the mean value level of a received signal can be detected in approximately one byte of the data of 10 Gb/s. The analog-to-digital converting circuit 241 comprises three differential amplifiers 2410, 2411 and 2412 different in threshold voltage and converts voltage output from the output voltage holding circuit to a digital value. The threshold of each differential amplifier is respectively Vref0, Vref1 and Vref2, Vref0 is 20 mV, Vref1 is 60 mV and Vref2 is 140 mV. The Vref selecting circuit 260 is a circuit for selecting voltage to be input to the output differential amplifier 3 as reference voltage Vref out of plural threshold voltage based upon the output value of the analog-to-digital converting circuit 241 and comprises a determination circuit 261 for determining Vref based upon the output value of the analog-to-digital converting circuit 241, a selector 262 and a determined output holding circuit 263. The output of the determination circuit 261 is held in the determined output holding circuit 263 according to a sampling pulse input from an external device. FIG. 8 shows relationship among signals input/output to/from the determination circuit 261.

Voltage input to the selector 262 so that it is selected as reference voltage Vref is respectively Vref10, Vref11 and Vref12, Vref10 is 10 mV, Vref11 is 30 mV and Vref12 is 70 mV.

Next, the operation of the circuits in the third embodiment will be described using a timing chart shown in FIG. 7. In this embodiment, a received optical signal is a packet (cell)

signal composed of 64 bytes and the data transmission rate is set to 10 Gb/s. The leading 6 bytes of the cell are a preamble for determining the level of a signal and for pull in, are '1010', 2 bytes of them are a header for synchronizing with a frame and 4 bytes of them are a signal for controlling others. As the photodetector 5 outputs photo current proportional to an input optical signal, photo current input to the preamplifier circuit 2 is converted from current signal to voltage signal and a waveform 1201 is output. Similar to the first embodiment, the peak voltage of the waveform 1201 varies in the time constant of approximately one byte as shown in a waveform 1202 and when a packet is input, the peak value of the output of the preamplifier circuit is detected in one byte in the preamble as shown in the waveform 1202. Afterward, while the preamble is received, the peak value becomes a fixed value. In this example, as the fixed value is larger than Vref0 and is smaller than Vref1, the output of the differential amplifiers 2410, 2411 and 2412 different in a threshold at this time is respectively "1", "0" and "0" as shown in waveforms 1203 to 1205. At this time, referring to FIG. 8, the output of the determination circuit 261 is (se10, se11)=(0, 0). As shown in a waveform 1206, when a sampling pulse is input from an external device among the second to the fifth bytes of the preamble and the output Se10 and Se11 of the determination circuit 261 is held, a Vref selection signal (S0, S1)=(0, 0) according to the level of the cell can be held while the cell is received. When (S0, S1)=(0, 0), Vref10 is selected. As the selection signal (S0, S1) is unchanged as shown in waveforms 1207 and 1208 even when a bit "0" continues by 10 bits or more in an input signal and mean value voltage varies, the selected reference voltage is unchanged as shown in a waveform 1209. Therefore, as shown in a waveform 1210, while the cell is received, input data can be discriminated under always the same reference voltage. As a level is detected in the preamble, suitable reference voltage out of plural voltage is selected and data is discriminated even if levels every cell are different, data can be correctly received.

In the third embodiment, the output voltage holding circuit 240 for holding the output of the preamplifier circuit 2 is composed using a peak detecting circuit. However, the configuration of the output voltage holding circuit 240 is not limited to the above, and in place of the peak detecting circuit, a mean value holding circuit for holding the mean value of output may be also used. A mean value held by the mean value holding circuit is input to the analog-to-digital converting circuit 241 and reference voltage may be also selected in the Vref selecting circuit 260 based upon each output of the differential amplifiers 2410 to 2412 different in a threshold. In this modified example, reference voltage can be also stabilized as in the third embodiment.

Fourth Embodiment

Figure 9:
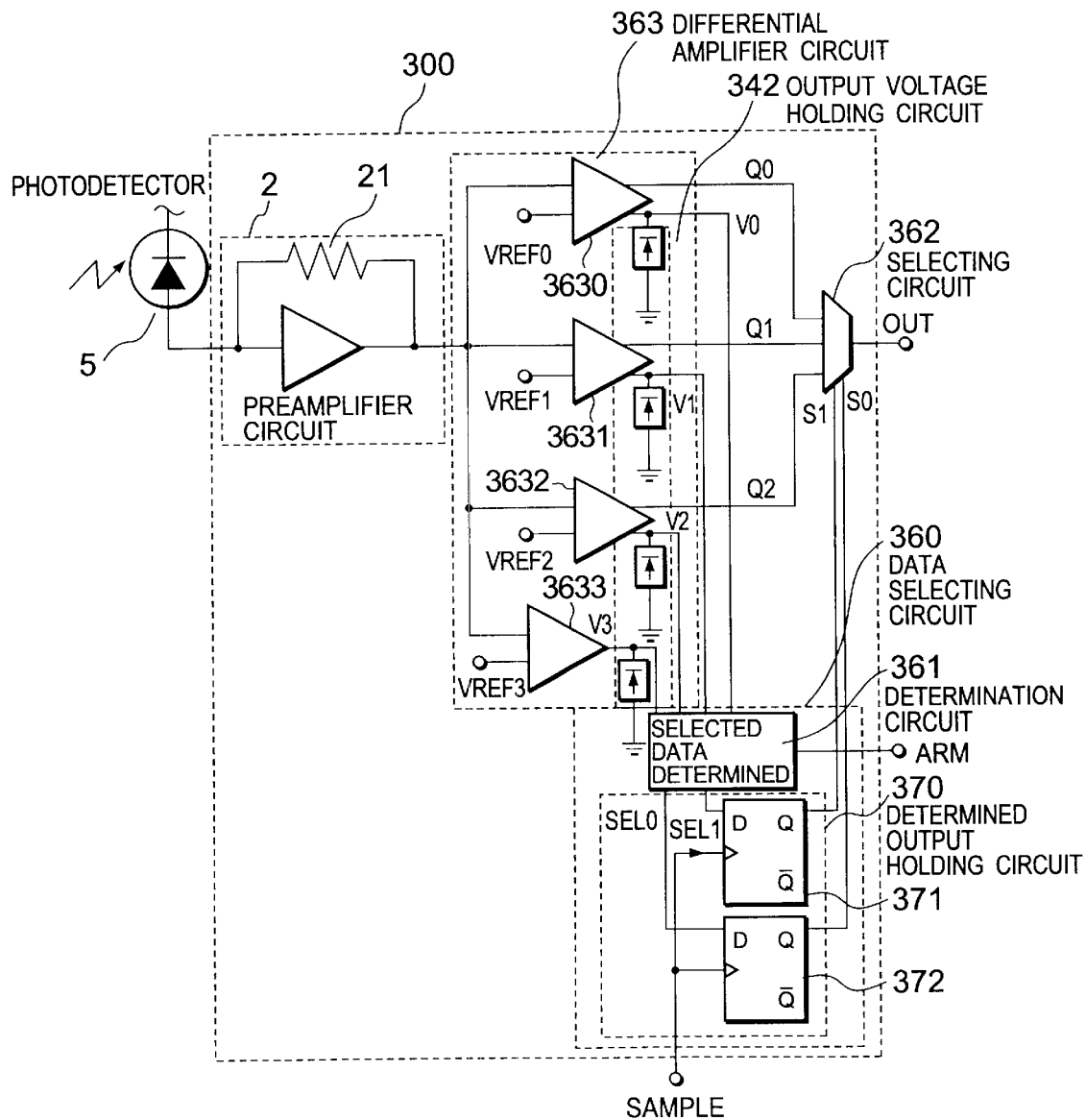
FIG. 9 is a block diagram showing an optical receiving circuit according to a fourth embodiment of the present invention.
Figure 10:
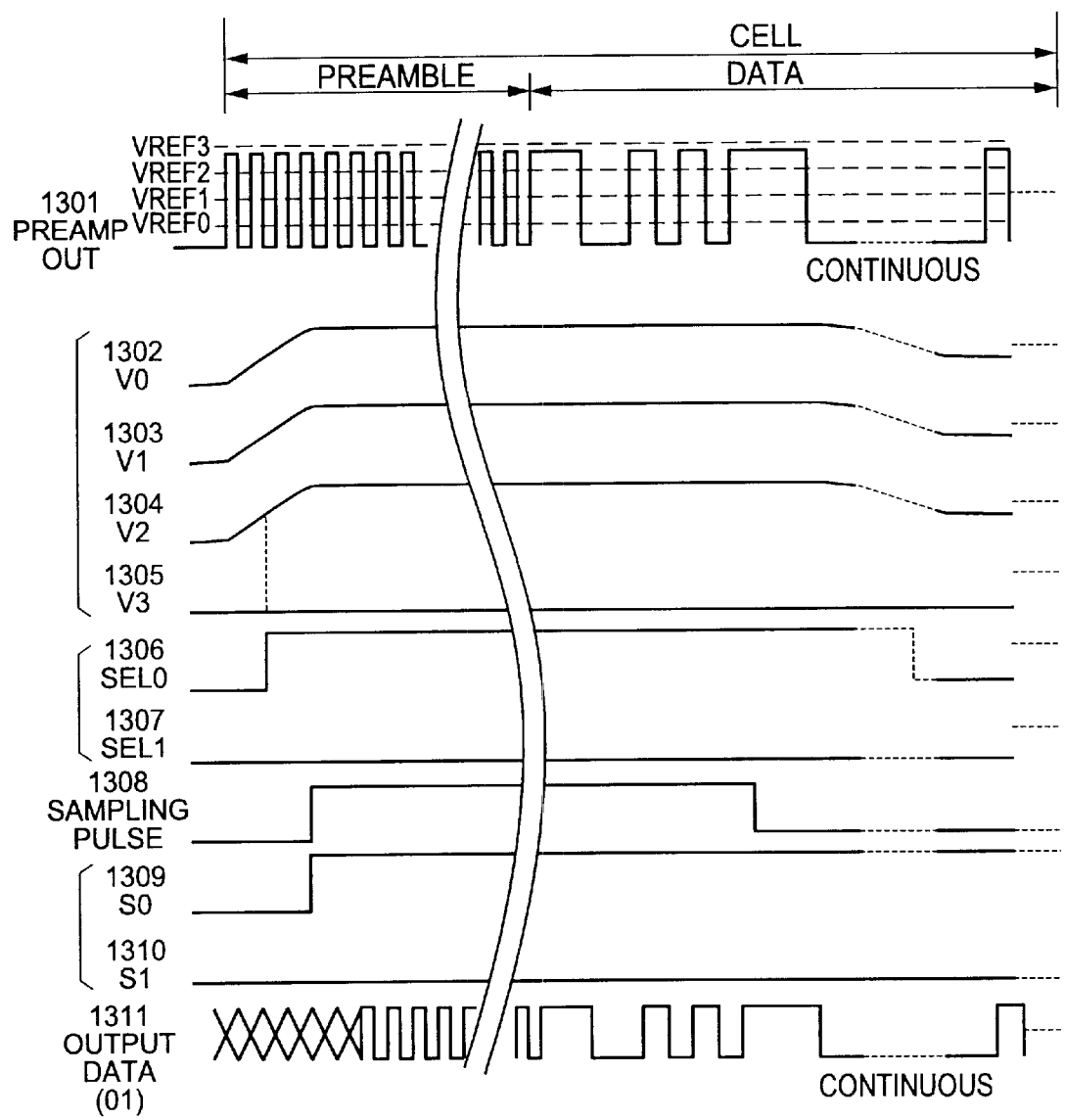
FIG. 10 is a timing chart for explaining the operation of the optical receiving circuit according to the fourth embodiment.

Next, referring to FIGS. 9 and 10, a fourth embodiment of the present invention will be described. FIG. 9 is a block diagram showing an optical receiving circuit according to the fourth embodiment. An optical receiving circuit 300 connected to a photodetector 5 is produced in a GaAs·EMES-FET process having a gate 0.15 µm long. The optical receiving circuit 300 comprises a preamplifier circuit 2, a differential amplifier circuit 363 provided with plural differential amplifiers different in a threshold, a selecting circuit 362 and a data selecting circuit 360. The preamplifier circuit 2 is similar to that in the first embodiment. The differential amplifier circuit 363 comprises four differential amplifiers 3630, 3631, 3632 and 3633 different in a threshold. The threshold of each differential amplifier is respectively Vref0, Vref1, Vref2 and Vref3, Vref0 is 20 mV, Vref1 is 60 mV, Vref2 is 100 mV and Vref3 is 140 mV. One output Q0, Q1 and Q2 of three differential amplifiers 3630 to 3632 of each differential amplifier is input to the selecting circuit 362, the other is input to the output voltage holding circuit 342 together with the output of the other differential amplifier 3633 and data discriminated under suitable reference voltage of the output Q0, Q1 and Q2 is selected using the determination circuit 361 in the data selecting circuit 360 based upon the peak voltage values V0, V1, V2 and V3. FIG. 11 shows relationship among signals input/output to/from the determination circuit 361.

As the time constant of the output voltage holding circuit 342 is set to 1 ns, V0, V1, V2 and V3 according to the level of a received signal can be detected in approximately one byte of the data of 10 Gb/s.

Next, the operation of the circuits in the fourth embodiment will be described using a timing chart shown in FIG. 10. In this embodiment, a received optical signal is a packet (cell) signal composed of 64 bytes and the data transmission rate is set to 10 Gb/s. The leading 6 bytes of the cell are a preamble for determining the level of a signal and for pull-in, are '1010-', 2 bytes of them are a header for synchronizing with a frame and 4 bytes of them are a signal for controlling others. As the photodetector 5 outputs photo current proportional to an input optical signal, photo current input to the preamplifier circuit 2 is converted from current signal to voltage signal and a waveform 1310 is output. When the waveform 1310 is input to four differential amplifiers 3630 to 3633 different in a threshold, the peak values V0, V1, V2 and V3 of the respective output vary in the time constant of approximately one byte as shown in waveforms 1302, 1303, 1304 and 1305 and when a cell is input, V0, V1, V2 and V3 become a fixed value in one byte in the preamble. In this example, as the fixed value is larger than Vref2 and is smaller than Vref3, V0, V1, V2 and V3 are respectively "1", "1", "1" and "0" as shown in the waveforms 1302 to 1305. At this time, referring to FIG. 11, the output of the determination circuit 361 is (se10, Se11)=(1, 0). As shown in a waveform 1308, when a sampling pulse is input from an external device among the second to the fifth bytes of the preamble and the output Se10 and Se11 of the determination circuit 361 is held, (S0, S1)=(1, 0), Q1 is selected in the selecting circuit 362 and is output from it. As the determined output holding circuit 370 is composed of a flip-flop, a data selection signal (S0, S1)=(1, 0) for selecting data discriminated under reference voltage according to the level of a cell can be held while the cell is received. As the selection signal (S0, S1) is unchanged as shown in waveforms 1309 and 1310 even when mean value voltage varies because a bit "0" continues by 10 bits or more in an input signal, the selected output is unchanged. Therefore, while a packet is received, data discriminated under always the same reference voltage can be output. As a level is detected in the preamble, data discriminated under suitable reference voltage out of data discriminated under plural reference voltage is selected and output, data can be correctly received.

In the fourth embodiment, the output voltage holding circuit 342 is composed using a peak detecting circuit. However, the configuration of the output voltage holding circuit 342 is not limited to the above, and in place of the peak detecting circuit, a mean value holding circuit may also be used. In this case, discriminated data is selected in the mean value holding circuit. The other configuration and the operation are similar to those in the fourth embodiment. In this modified example, reference voltage can be also stabilized as in the fourth embodiment.

Fifth Embodiment

Figure 12:
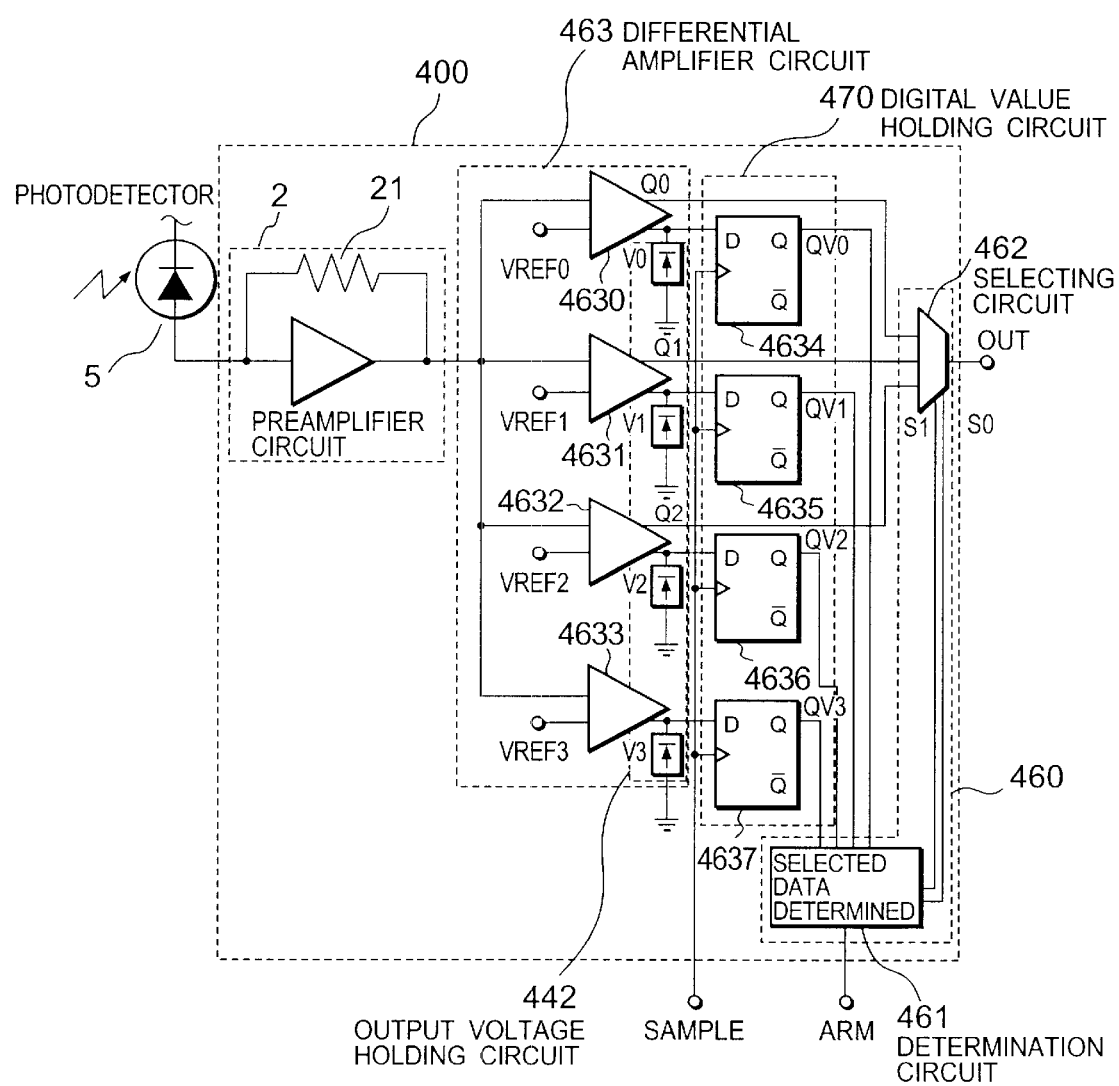
FIG. 12 is a block diagram showing an optical receiving circuit according to a fifth embodiment of the present invention.
Figure 13:
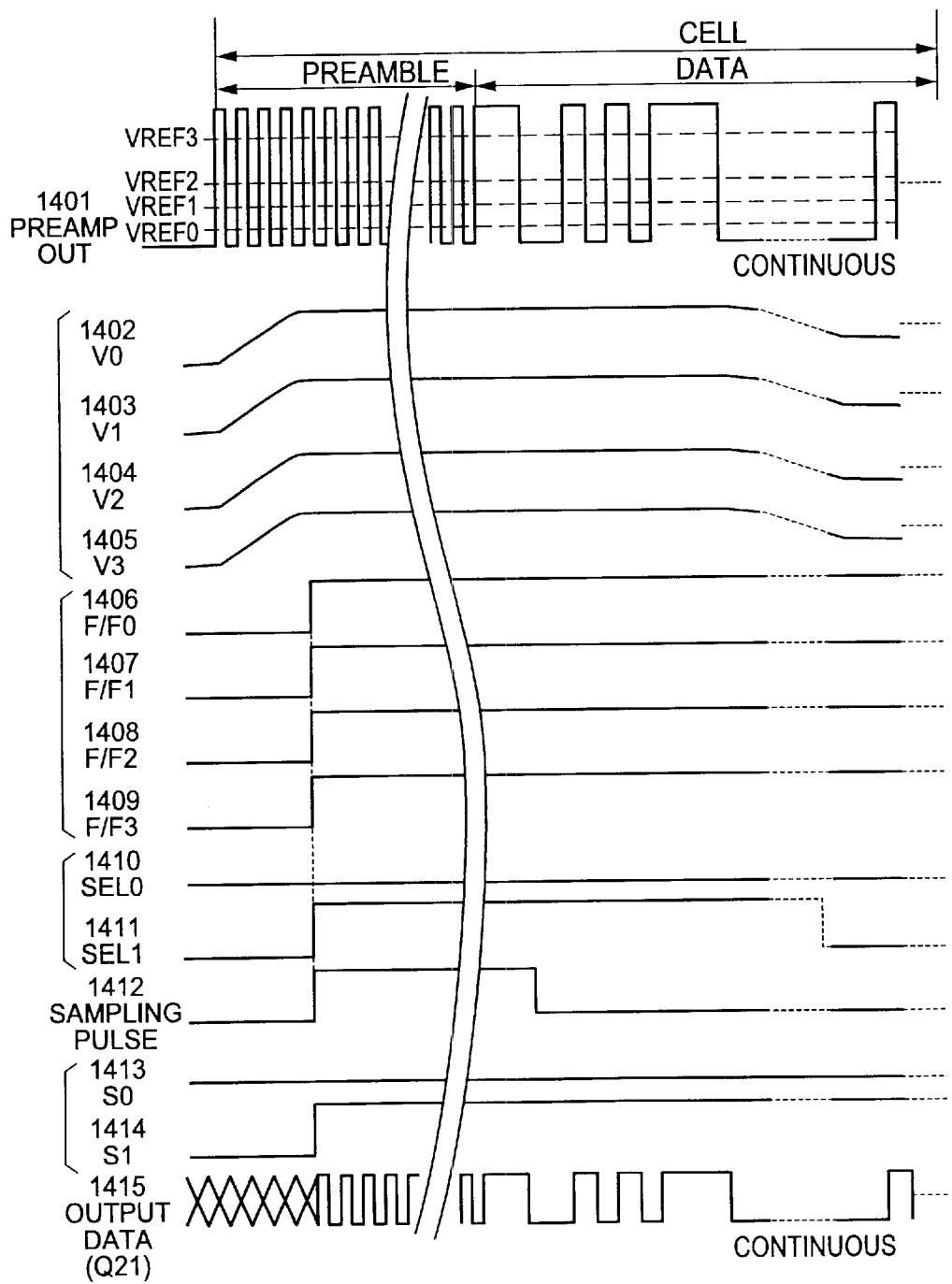
FIG. 13 is a timing chart for explaining the operation of the optical receiving circuit according to the fifth embodiment.

Next, referring to FIGS. 12 and 13, a fifth embodiment will be described. FIG. 12 is a block diagram showing the fifth embodiment. An optical receiving circuit 400 connected to a photodetector 5 is produced in a GaAs·MES-FET process having a gate 0.15 μm long. The optical receiving circuit 400 comprises a preamplifier circuit 2, a differential amplifier circuits 463 having mutually different threshold, a selecting circuit 462 and a data selecting circuit 460. The preamplifier circuit 2 is similar to that in the first embodiment. The differential amplifier circuit 463 including the differential amplifiers different in a threshold is composed of four differential amplifiers 4630, 4631, 4632 and 4633. The threshold of each differential amplifier is respectively Vref0, Vref1, Vref2 and Vref3, Vref0 is 20 mV, Vref1 is 60 mV, Vref2 is 100 mV and Vref3 is 140 mV. One output Q0, Q1 and Q2 of three differential amplifiers 4630 to 4632 of each differential amplifier is input to the selecting circuit 462, the other is input to the output voltage holding circuit 442 composed of a peak detecting circuit together with the output of the other differential amplifier 4633 and the peak voltage values V0, V1, V2 and V3 are input to the digital value holding circuit 470. The digital value holding circuit 470 comprises flip-flops 4634, 4635, 4636 and 4637, data discriminated under suitable reference voltage out of Q0, Q1 and Q2 is determined based upon the output QV0, QV1, QV2 and QV3 of these flip-flops in the determination circuit 461 and is selected in the selecting circuit 462. FIG. 14 shows relationship among signals input/output to/from the determination circuit 461. As the time constant of the output voltage holding circuit 442 is set to 1 ns, V0, V1, V2 and V3 according to the level of a received signal can be detected in approximately one byte of the data of 10 Gb/s.

Next, the operation of the circuits in the fifth embodiment will be described using a timing chart shown in FIG. 13. In this embodiment, a received optical signal is a packet (cell) signal composed of 64 bytes and the data transmission rate is set to 10 Gb/s. The leading 6 bytes of the cell are a preamble for determining the level of a signal and for pull-in, are '1010-', 2 bytes of them are a header for synchronizing with a frame and 4 bytes of them are a signal for controlling others. As the photodetector 5 outputs photo current proportional to an input optical signal, photo current input to the preamplifier circuit 2 is converted from current signal to voltage signal and a waveform 1401 is output. When the waveform 1401 is input to four differential amplifiers 4630 to 4633 different in a threshold, the peak values V0, V1, V2 and V3 of the respective output vary in the time constant of approximately one byte as shown in waveforms 1402, 1403, 1304 and 1405 and when a packet is input, V0, V1, V2 and V3 become a fixed value in one byte in the preamble. In this example, as the fixed value is larger than Vref3, V0, V1, V2 and V3 are respectively "1", "1", "1" and "1" as shown in the waveforms 1402 to 1405. As shown in a waveform 1412, when a sampling pulse is input to the digital value holding circuit 470 from an external device among the second to the fifth bytes of the preamble and V0, V1, V2 and V3 are fetched and held, the output QV0, QV1, QV2 and QV3 are as shown in waveforms 1406, 1407, 1408 and 1409. Even when V0, V1, V2 and V3 vary because a bit "0"continues by 10 bits or more in an input signal, QV0, QV1, QV2 and QV3 are fixed. The output (S0, S1) of the determination circuit 461 at this time is (0, 1), Q2 is selected in the selecting circuit 462 and is output from it. As the digital value holding circuit 470 is composed of a flip-flop, data discriminated under reference voltage according to the level of a packet is selected while the packet is received and a data selection signal (S0, S1)=(0, 1) can be held. As the selection signal (S0, S1) is unchanged as shown in waveforms 1413 and 1414 even if the value of the peak value holding circuit varies because a bit '0' continues by 10 bits or more in an input signal, the selected output is unchanged. Therefore, data discriminated under always the same reference voltage can be output while a packet is received. As a level is detected in the preamble, data discriminated under suitable reference voltage out of data discriminated under plural reference voltage is selected and output even when levels every packet are different, data can be correctly received.

In the fifth embodiment, the output voltage holding circuit 442 is composed by a peak detecting circuit. However, the configuration of the output voltage holding circuit 442 is not limited to the above and in place of the peak detecting circuit, a mean value holding circuit may be also used. In this case, discriminated data are selected in the mean value holding circuit. The other configuration and the operation are similar to those in the fifth embodiment. In this modified example, reference voltage can be also stabilized as in the fifth embodiment.

In the above embodiments, for a process for manufacturing the optical receiving circuit, the GaAs·EMES-FET process is used, however, it may be also a Si-bipolar process, a GaAs·HBT process and a CMOS process. Also, the packet is composed of 64 to 859 bytes or is a fixed cell composed of 64 bytes, however, it may be also composed of 1000 bytes. Three different values of threshold voltage are provided, however, four or five values may be also provided and an interval between the values of threshold voltage is also arbitrary. The preamplifier circuit is the transimpedance type, however, a high impedance type may be also used.

Figure 15:
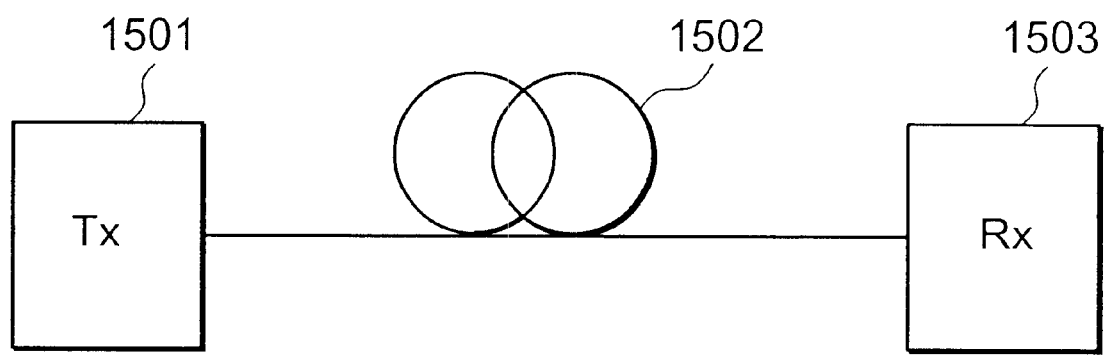
FIG. 15 shows the configuration of an optical communication device according to the present invention.

FIG. 15 shows the configuration of an optical communication device according to the present invention. As shown in FIG. 15, the optical communication device according to the invention comprises an optical transmitting circuit 1501, an optical fiber transmission line 1502 and an optical receiving circuit 1503. The optical receiving circuit is any of the optical receiving circuits equivalent to the first to fifth embodiments.

As described above, according to the present invention, a small-sized small-latency network with large capacity can be realized without regulating so that difference between the levels of optical signals every path is equal by providing the second to fifth optical receiving circuits in addition to the first optical receiving circuit characterized in that the first optical receiving circuit is provided with the preamplifier circuit to which photo current from the photodetector is input for receiving an optical signal, the output differential amplifier arranged after the preamplifier circuit and to which the output of the preamplifier circuit is input in a state of a positive phase and the mean value holding circuit for holding the mean value per time of voltage output from the preamplifier circuit and the output of the mean value holding circuit is input to the output differential amplifier in a state of a negative phase.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical receiving circuit comprising:
a preamplifier circuit connected to a photodetector, said preamplifier circuit receiving photo current from said photodetector;
an output differential amplifier coupled to the preamplifier circuit, the output differential amplifier receiving a voltage output from said preamplifier circuit; and
a reference voltage generating circuit coupled to said differential amplifier and coupled to said preamplifier circuit, said reference voltage generating circuit generating a reference voltage based upon a mean value per time of said voltage output from said preamplifier circuit, said reference voltage generating circuit supplying said reference voltage to said output differential amplifier,
wherein said reference voltage generating circuit includes:
a sample-hold circuit;
an output voltage holding circuit holding said voltage output from said preamplifier circuit;
a digital value holding circuit coupled to the output voltage holding circuit, the digital value holding circuit holding an output of said output voltage holding circuit as a digital value; and
a voltage selecting circuit coupled to said digital value holding circuit, the voltage selecting circuit selecting said reference voltage from a plurality of predetermined voltages based upon said digital value voltage held by said digital value holding circuit.

2. The optical receiving circuit according to claim 1, wherein:
said digital value holding circuit is provided with a plurality of flip-flops having different discrimination levels.

3. The optical receiving circuit according to claim 1, wherein:
said output voltage holding circuit has a capacitance.

4. An optical communication device, comprising:
an optical transmitting circuit outputting an optical signal modulated based upon transmit data;
an optical fiber transmission line coupled to said optical transmitting circuit, said optical fiber transmission line transmitting said optical signal; and
an optical receiving circuit according to claim 1 coupled to said optical fiber transmission line, said optical receiving circuit receiving said optical signal output via said optical fiber transmission line.

5. An optical receiving circuit comprising:
a preamplifier circuit connected to a photodetector, said preamplifier circuit receiving photo current from said photodetector;
an output differential amplifier coupled to the preamplifier circuit, the output differential amplifier receiving a voltage output from said preamplifier circuit; and
a reference voltage generating circuit coupled to said differential amplifier and coupled to said preamplifier circuit, said reference voltage generating circuit generating a reference voltage based upon a mean value per time of said voltage output from said preamplifier circuit, said reference voltage generating circuit supplying said reference voltage to said output differential amplifier,
wherein said reference voltage generating circuit includes:
a sample-hold circuit;
an output voltage holding circuit holding said voltage output from said preamplifier circuit;
an analog-to-digital converting circuit coupled to said output voltage holding circuit, said analog-to-digital converting circuit having plural differential amplifiers different in threshold voltage converting an output of said output voltage holding circuit to digital data;
a determination circuit coupled to said analog-to-digital converting circuit, said determination circuit determining a mean value of the output of said preamplifier circuit based upon the output of said analog-to-digital converting circuit and outputting a selection signal;
a determined output holding circuit coupled to said determination circuit, said determined output holding circuit holding an output of said determination circuit; and
a selecting circuit coupled to said determined output holding circuit, said electing circuit selecting voltage to be input to one of said plural differential amplifiers for reference, out of preset plural voltage based upon a signal from said determined output holding circuit.

6. The optical receiving circuit according to claim 5, wherein: said determined output holding circuit includes a flip flop.

7. The optical receiving circuit according to claim 5, wherein:
said output voltage holding circuit has a capacitance.

8. An optical communication device, comprising:
an optical transmitting circuit outputting an optical signal modulated based upon transmit data;
an optical fiber transmission line coupled to said optical transmitting circuit, said optical fiber transmission line transmitting said optical signal; and
an optical receiving circuit according to claim 5 coupled to said optical fiber transmission line, said optical receiving circuit receiving said optical signal output via said optical fiber transmission line.

9. An optical receiving circuit, comprising:
a preamplifier circuit connected to a photodetector, said preamplifier circuit receiving an photo current from said photodetector;
plural differential amplifiers coupled to said preamplifier circuit, said plural differential amplifiers receiving a signal output from said preamplifier circuit and having respectively different threshold voltages;
an output voltage holding circuit coupled to said plural differential amplifiers, said output voltage holding circuit holding respective output voltages of said plural differential amplifiers;
a determination circuit coupled to said output voltage holding circuit, said determination circuit determining a mean value of an output of said preamplifier circuit according to a threshold voltage based upon an output of said output voltage holding circuit and outputting a selection signal; and
a selecting circuit coupled to said differential amplifiers and said determination circuit selecting one signal out of respective output voltages of said plural differential amplifiers based upon said selection signal.

10. The optical receiving circuit according to claim 9, further comprising:
a determined output holding circuit coupled to said determination circuit, said determined output holding circuit storing said selection signal output by said determination circuit and supplying said stored selection signal to said selecting circuit.

11. The optical receiving circuit according to claim 10, wherein:

said determined output holding circuit includes a flip flop.

12. The optical receiving circuit according to claim 9, further comprising:

an output value holding circuit coupled to said plural differential amplifiers storing the output of said output voltage holding circuit and supplying said stored output of said output voltage holding circuit to said determination circuit.

13. The optical receiving circuit according to claim 12, wherein:

said output value holding circuit includes a flip-flop.

14. The optical receiving circuit according to claim 9, wherein:

said output voltage holding circuit has a capacitance.

15. An optical communication device, comprising:

an optical transmitting circuit outputting an optical signal modulated based upon transmit data;

an optical fiber transmission line coupled to said optical transmitting circuit, said optical fiber transmission line transmitting said optical signal; and an optical receiving circuit according to claim 9 coupled to said optical fiber transmission line, said optical receiving circuit receiving said optical signal output via said optical fiber transmission line.

* * * * *